United States Patent
Mischiatti

[19]

[11] Patent Number: 5,918,539
[45] Date of Patent: Jul. 6, 1999

[54] DEVICE FOR MAKING PATTERNS OR IMAGES HAVING PREDETERMINED SHAPE USING POWDER SUBSTANCES

[75] Inventor: Romano Mischiatti, Taglio Di PO, Italy

[73] Assignee: SO.GE. CA. S.N.C., Taglio Di PO, Italy

[21] Appl. No.: 09/128,750

[22] Filed: Aug. 4, 1998

[30] Foreign Application Priority Data

May 14, 1998 [IT] Italy .................................. BO98A0311

[51] Int. Cl.$^6$ ....................................................... A23L 1/00
[52] U.S. Cl. .................... 99/494; 99/275; 99/287; 99/485; 118/13; 118/24; 222/173; 222/226
[58] Field of Search .............................. 99/275, 285–288, 99/430, 439, 279, 295, 494, 485, 516; 118/16, 24, 18, 312, 68, 303, 308, 629, 13; 222/52, 54, 57, 78, 161, 173, 129.1, 129.4, 164, 167, 192, 201, 227, 232, 463, 226; 366/196, 219, 273, 165.4, 182.4; 261/74, 81; 141/102, 279

[56] References Cited

U.S. PATENT DOCUMENTS

| | | | |
|---|---|---|---|
| 3,622,054 | 11/1971 | Davidson | 222/226 X |
| 3,888,394 | 6/1975 | Tanaka et al. | 222/173 X |
| 4,141,316 | 2/1979 | Grun | 118/24 X |
| 4,210,507 | 7/1980 | Davidson et al. | 118/308 X |
| 4,291,640 | 9/1981 | Payne et al. | 118/13 X |
| 4,307,823 | 12/1981 | Heiss et al. | 222/211 X |
| 4,388,338 | 6/1983 | Wittenborg | 99/275 X |
| 4,759,634 | 7/1988 | Blom | 141/279 X |
| 4,850,515 | 7/1989 | Cleland | 366/196 X |
| 4,998,463 | 3/1991 | Precht et al. | 99/300 |
| 5,195,454 | 3/1993 | Wadell | 99/494 |
| 5,535,921 | 7/1996 | Gelman et al. | 222/167 |
| 5,643,361 | 7/1997 | Wadell | 99/494 X |

*Primary Examiner*—Timothy F. Simone
*Attorney, Agent, or Firm*—Nims Howes Collison Hansen & Lackert

[57] ABSTRACT

A device for making patterns or images having predetermined shape uses powder substances introduced into a container disposed inside a cylindrical body. The container has an open bottom and features at top a recess with a related hole. A bottom mask, with a perforated pattern or image, closes the bottom of the container and is kept by retention means engaging with the cylindrical body. A driving device, set into the recess, has a shaft passing through the hole and fastened to a scraper member disposed inside the container for facilitating passage of the powder substance through holes of the perforated pattern or image of the bottom mask.

8 Claims, 2 Drawing Sheets

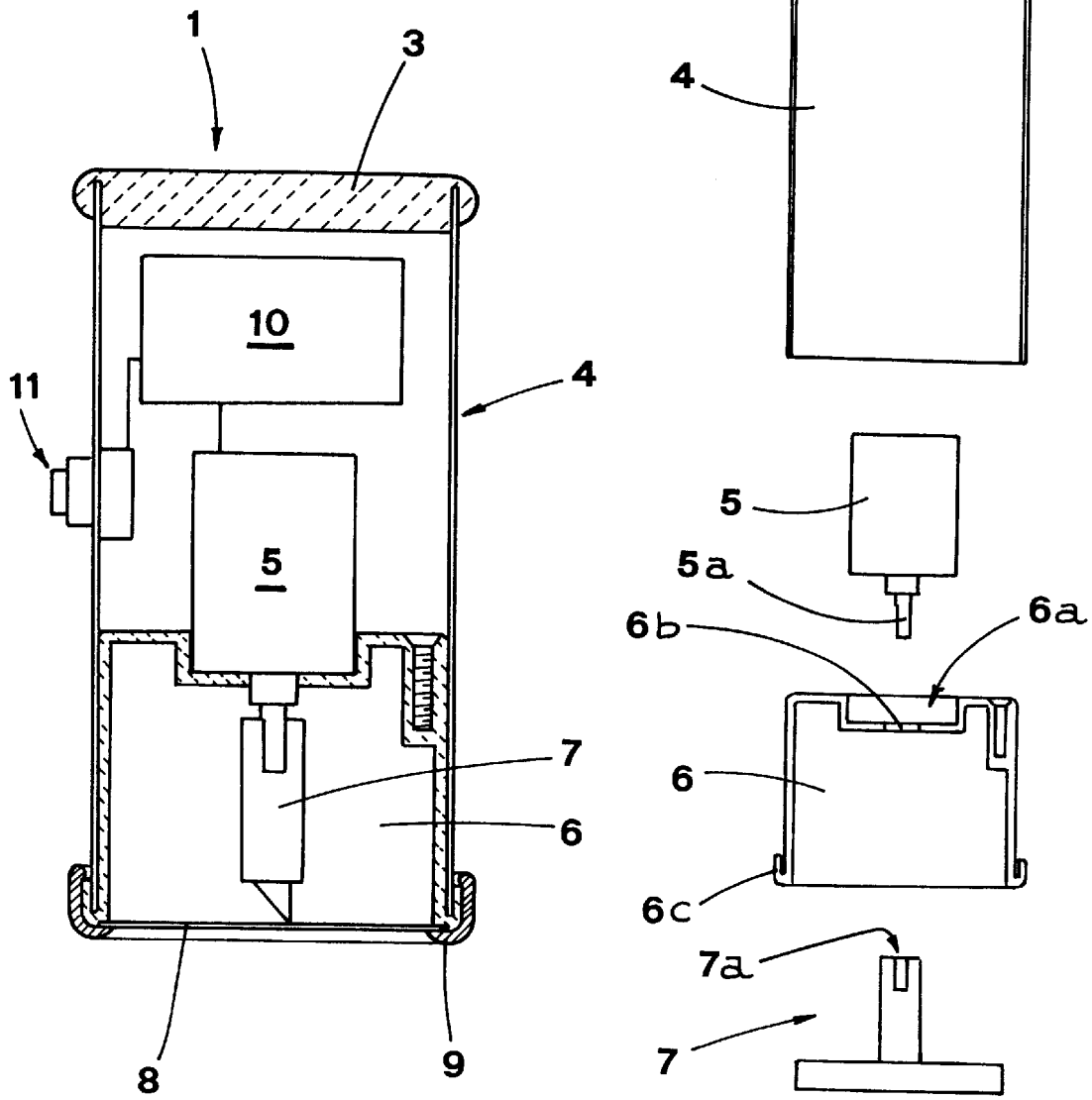

FIG.5 FIG.4
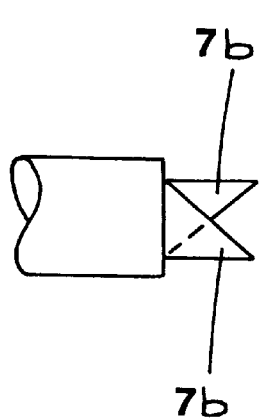
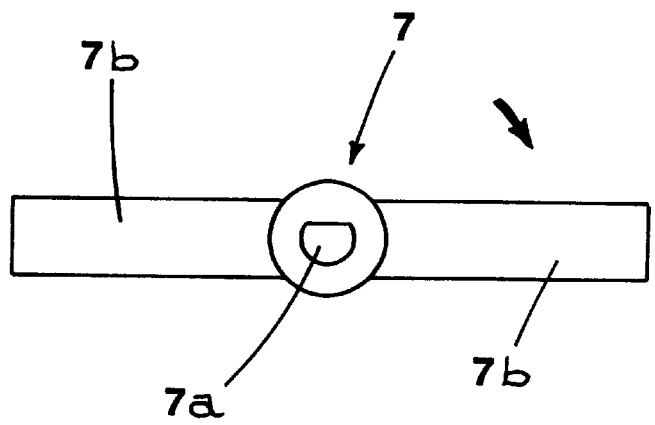
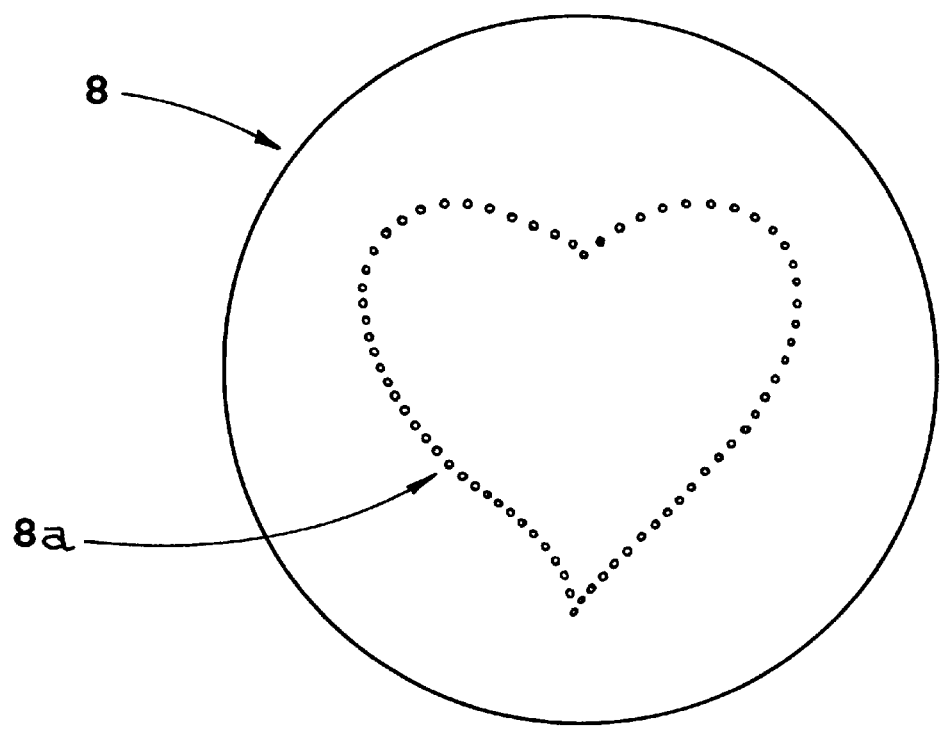
FIG.3

DEVICE FOR MAKING PATTERNS OR IMAGES HAVING PREDETERMINED SHAPE USING POWDER SUBSTANCES

FIELD OF THE INVENTION

The present invention relates to devices for making patterns or images having predetermined shape, using powder substances.

In particular the invention is conceived for decoration of hot beverages, sweets, cakes, and the like.

DESCRIPTION OF PRIOR ART

It is known that sweets, cakes or hot beverages, the latter preferably covered with a foamy or cream layer, are decorated with patterns or images having predetermined shape.

The patterns or images are made by means of suitable vibrating devices using powder substances (e.g. cocoa, vanilla, sugar, etc.).

Basically, these devices include a cylindrical body, inside which there is made a container for a powder substance to be used and, in the lower part, a suitably shaped and perforated sift.

A motor, usually disposed coaxial with these devices, features, keyed onto its shaft, an eccentric weight, whose rotation drives this cylindrical body to vibrate.

In this way, the powder contained inside the container passes through the perforated part of the sift and falls onto the surface of the sweet, cake or on the foamy or creamed surface of the hot beverage situated below.

The pattern or the shape of the image will be better defined if there is a suitable chromatic contrast between the powder substance and the surface of hot beverage, cake or sweets to be decorated.

The biggest disadvantage of this device consists in the poor sharpness of the image thus obtained.

Another disadvantage derives from the fact that the powder substance, under the action of the vibration, passes through the perforated area of the sift in a random way.

SUMMARY OF THE INVENTION

The main object of the present invention is to overcome the above mentioned disadvantages by a device for obtaining patterns or images having predetermined shape using powder substances, that guarantees the best definition and a high chromatic contrast.

Another object of the present invention is to propose a device obtained with a simple, cheap, extremely reliable and practical technical solution, which allows to define the profile of the chosen pattern or image in best way and to obtain the best chromatic contrast.

The above mentioned objects are obtained, in accordance with the content of the claims, by means of a device for obtaining patterns or images having predetermined shape using powder substances, the device including:

a cylindrical body;

an container located inside said cylindrical body, for receiving powder substance, said container having an open bottom and a closed top;

a recess made in said closed top of said container so as to be concentric to said cylindrical body;

a hole mate in said recess;

a bottom mask, provided with perforated profiles, for allowing powder substance contained in the container to pass, said mask being set to close said bottom of said container;

retention means engaging removably with said cylindrical body for fixing said bottom mask thereto;

a driving device, at least partially introduced in said recess, with a shaft of said driving device passing through said hole;

a power supply situated inside said cylindrical body for feeding said driving device;

a member, shaped substantially like an overturned "T", situated inside said container and connected to said shaft of said driving device, with said member rotating and thus facilitating the passage of powder substance in the container through said perforated profiles of said bottom mask.

BRIEF DESCRIPTION OF THE DRAWINGS

The characteristics of the invention have been pointed out in the following, with a particular reference to the enclosed drawings, in which:

FIG. 1 is a front schematic view of a vertical section of the proposed device;

FIG. 2 is an exploded schematic view of the same device;

FIGS. 3, 4 are schematic plan view of particularly significant parts of the device;

FIG. 5 is a lateral view of the part shown in FIG. 4.

BEST MODE OF CARRYING OUT THE INVENTION

With reference to the enclosed drawings, reference numeral 1 indicates the proposed device for obtaining flat patterns or images.

Basically, this device 1 includes a cylindrical body 4, whose top is closed by a cover 3.

The lower portion of this cylindrical body 4 includes a container 6 for powder substances, having transversal section matching the internal section of the cylindrical body. A circular, "U"-shaped edge 6c extending from the base of the container 6, is coupled with the corresponding bottom of the cylindrical body 4 (FIG. 1).

The container 6 is set in coaxial relation with the cylindrical body 4 and open at the bottom. A ring-like seat is formed in the region of the circular edge 6c of the container 6.

A bottom mask 8, suitably perforated, e.g. a sift, is introduced into the ring-like seat for closing the bottom of the container 6.

The powder substance contained in the container 6 passes through suitably perforated profiles 8a of the mask 8 and reproduces the pattern or image.

The mask 8 is fastened into the ring-like seat, made along the circular edge 6c of the container 6, by a retention member 9, which is removably snap-coupled with this circular edge 6c.

The top of the container 6 features a recess 6a, coaxial with the cylindrical body 4 and having a hole 6b for receiving the suitably shaped shaft 5a therein of a driving device 5.

The driving device includes, for instance, an electric motor-gear 5 having pre-established reduction ratio, which is fed by a power supplying battery 10, disposed inside the cylindrical body 4.

The motor 5 is operated by a push button 11, placed in the middle part of the cylindrical body 4 outer surface.

The motor 5 is press-fit into the recess 6a, and the shaft 5a of the motor is keyed into a complementary receiving bore 7a made in an element 7, substantially shaped like a overturned "T".

The element 7, e.g. a scraper element, is situated inside the container 6 and includes a vertical stem, whose upper part is provided with the receiving bore 7a, and two horizontal opposite extensions 7b, substantially constituted by scrapers arranged at suitable working angles with respect to the bottom mask.

These horizontal extensions 7b of the scraper 7 are rotated by the motor 5 and facilitate the passage of the powder substance, contained in the container 6 situated above, through the perforated profiles 8a of the mask 8.

When a surface of a hot beverage, kept in a suitable pot, is to be decorated, the device 1 is placed over the pot and the button 11 is pushed for a time sufficient to define the profile of the pattern or image.

While the battery 10, via the button 11, is feeding the motor 5, rotation of the scraper (7) allows and facilitates the passage of the powder substance, contained in the container 6, through the perforated profiles 8a of the mask 8, thus defining a particularly clear image.

After having been used, the proposed device can be advantageously placed on a support plane, in a overturned position with respect to FIG. 1, i.e. it is placed on the suitably shaped cover 3 of the cylindrical body 4.

The simple fastening of the bottom mask 8 to the container 6 by the retention member 9 allows the mask 8 to be easily and quickly replaced with another one with a different perforated profile 8a.

Since there is no vibration movement, the powder substance while falling can define the pattern or image in best way and create a considerable chromatic contrast with the beverage surface.

Location of the button 11 in the middle part of the cylindrical body 4 allows an excellent vertical stabilization of the proposed device, while being used, which positively influences the definition of the image thus obtained.

According to an interesting variation, the motor 5 working period can be controlled by a timer, so that the number of revolutions of the scraper (7), and consequently the quantity of the powder substance, are not determined by the user, but controlled by this timer.

Also this positively influences the definition of the image thus obtained.

It is also to be pointed out that the number of components of the device for obtaining flat pattern or images with a predetermined shape is limited and they are easily manufactured, which allows to keep the production costs low.

The above mentioned objects can be obtained by a simple technical solution, extremely reliable and practical, which improves the look of sweets, cakes or hot beverage being decorated by the proposed device.

It is understood that what above has been described as a mere, non limitative example, therefore possible shape and size variants remain within the protective scope of the present technical solution, as described above and claimed in the following.

What is claimed is:

1. A device for obtaining patterns or images having predetermined shape using powder substances, the device including:

a cylindrical body;

an container located inside said cylindrical body, for receiving powder substance, said container having an open bottom and a closed top;

a recess made in said closed top of said container so as to be concentric to said cylindrical body;

a hole mate in said recess;

a bottom mask, provided with perforated profiles, for allowing powder substance contained in the container to pass, said mask being set to close said bottom of said container;

retention means engaging removably with said cylindrical body for fixing said bottom mask thereto;

a driving device, at least partially introduced in said recess, with a shaft of said driving device passing through said hole;

a power supply situated inside said cylindrical body for feeding said driving device;

a member, shaped substantially like an overturned "T", situated inside said container and connected to said shaft of said driving device, with said member rotating and thus facilitating the passage of powder substance in the container through said perforated profiles of said bottom mask.

2. A device, according to claim 1, wherein said member has a vertical stem, whose upper part is provided with a bore, that receives said shaft of the driving device as a press-fit, and two opposite horizontal extensions, substantially parallel to said mask.

3. A device, according to claim 2, wherein said horizontal extensions include scrapers arranged at suitable working angles with respect to said bottom mask.

4. A device, according to claim 1, wherein said container features at bottom, in the region of said bottom mask, a circular "U"-shaped edge folded outwards, and removably coupled with the lower part of said cylindrical body.

5. A device, according to claim 1, wherein said bottom mask is set into a ring-like seat formed in the container.

6. A device, according to claim 1, wherein said driving device is operated by operation means placed in the middle part of said cylindrical body.

7. A device, according to claim 1, wherein said cover defines a support base for the device when not used.

8. A device, according to claim 1, wherein said driving device is an electric motor and said power supply is a battery.

* * * * *